US 6,535,646 B2

(12) United States Patent
Liguori

(10) Patent No.: US 6,535,646 B2
(45) Date of Patent: *Mar. 18, 2003

(54) DISCRETE COSINE TRANSFORM METHOD AND APPARATUS

(76) Inventor: Vincenzo Arturo Luca Liguori, P.O. Box 768, North Manly, New South Wales (AU), 2095

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,281

(22) Filed: Mar. 2, 1999

(65) Prior Publication Data

US 2002/0120657 A1 Aug. 29, 2002

(30) Foreign Application Priority Data

Mar. 6, 1998 (AU) .............................. PP2177

(51) Int. Cl.[7] .............................. G06K 9/36; G06K 9/54; H04N 7/12; H04N 1/415; G06F 7/52
(52) U.S. Cl. ..................... 382/250; 382/248; 382/253; 382/276; 382/304; 348/395.1; 348/403.1; 358/433; 708/626
(58) Field of Search ................ 382/248, 250, 382/307, 232, 234, 236, 239, 247, 253, 276, 304; 708/402, 406, 603, 607, 620, 623, 625, 626; 348/395.1, 403.1, 408.1; 358/432, 433

(56) References Cited

U.S. PATENT DOCUMENTS 4,633,386 A * 12/1986 Terepin ..................... 710/132
4,829,465 A    5/1989 Knauer et al. .............. 708/402
5,159,567 A * 10/1992 Gobert ....................... 708/625
5,243,551 A *  9/1993 Knowles .................... 708/603
5,434,808 A *  7/1995 Cohen ....................... 708/402
5,452,466 A *  9/1995 Fettweis ...................... 712/36
5,701,263 A * 12/1997 Pineda ....................... 708/402
5,867,414 A *  2/1999 Kao .......................... 708/607

FOREIGN PATENT DOCUMENTS

EP           2179770 A  *  3/1987 ............. G06F/7/52

* cited by examiner

Primary Examiner—Andrew W. Johns
Assistant Examiner—Daniel G. Mariam
(74) Attorney, Agent, or Firm—Davis & Bujold, P.L.L.C.

(57) ABSTRACT

A linear transform apparatus for implementing a linear transform on input data values to produce linear transformed output data, the apparatus comprising: input means for inputting input data values one after another to each of a series of multiplication means; a series of multiplication means interconnected with the input means for multiplying a current input data value by a constant to produce a current multiplier output; an interconnection network interconnecting the series of multiplication means to predetermined ones of a series of signed accumulator means; a series of signed accumulator means each interconnected to the interconnection network, each of the signed accumulator means producing an intermediate accumulator output by accumulating a corresponding one of the current multiplier outputs with a corresponding previous intermediate accumulator output, each of the signed accumulator means outputting the intermediate accumulator output as a corresponding linear transformed output data value.

8 Claims, 5 Drawing Sheets

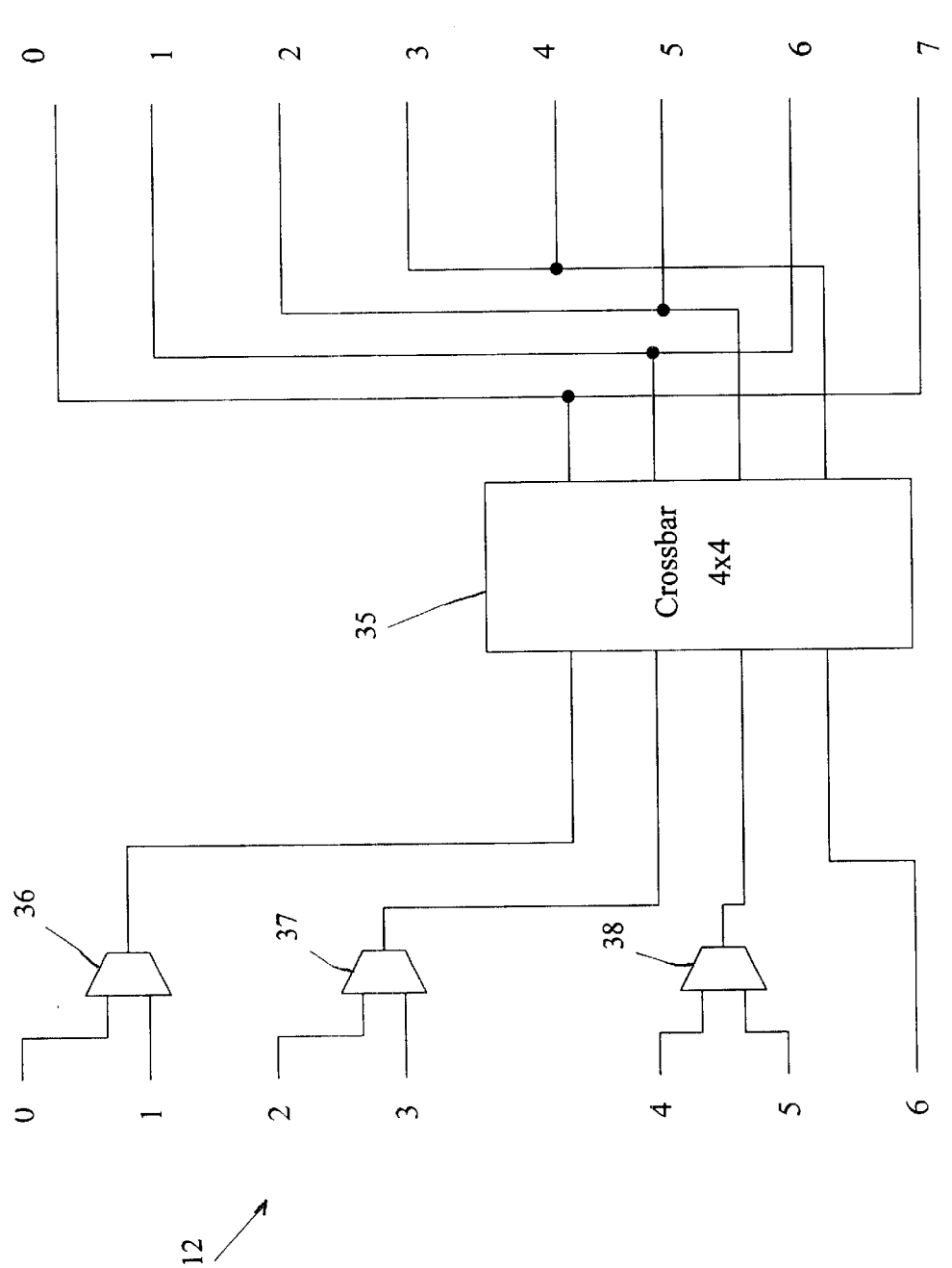

DISCRETE COSINE TRANSFORM METHOD AND APPARATUS

FIELD OF THE INVENTION

The present invention relates to transformations on data, and, in particular discloses an efficient method of implementing a discrete cosine transform

BACKGROUND OF THE INVENTION

Image transformations utilising, for example, the discrete cosine transform (DCT) are fundamental in data compression algorithms such as image compression algorithms or the like. Further, other transformations such as the Hadamard and the Karhunen-Loeve transform have been utilised in the process of reducing the number of coefficients required to represent and image. In particular, the discrete cosine transform has become a key element in fundamental multi-media algorithms such as JPEG and MPEG. The capability of the discrete cosine transform for compacting the energy of the signal into a few coefficiencies exploited for both sound and image compression. For a detailed discussion of the JPEG image compression standard, reference is made to the standard text "JPEG-still Image Data Compression Standard" by Pennebaker and Mitchell.

Due to the importance of the discrete cosine transform, a large number of efficient implementations have been proposed.

SUMMARY OF THE INVENTION

It is an object of the present invention to provide for an efficient alternative form of implementation of linear transforms such as the discrete cosine transform.

In accordance with a first aspect of the present invention, there is provided a linear transform apparatus for implementing a linear transform on input data values to produce linear transformed output data, the apparatus comprising: input means for inputting input data values one after another to each of a series of multiplication means; a series of multiplication means interconnected with the input means for multiplying a current input data value by a constant to produce a current multiplier output; an interconnection network interconnecting the series of multiplication means to predetermined ones of a series of signed accumulator means; a series of signed accumulator means each interconnected to the interconnection network, each of the signed accumulator means producing an intermediate accumulator output by accumulating a corresponding one of the current multiplier outputs with a corresponding previous intermediate accumulator output, each of the signed accumulator means outputting the intermediate accumulator output as a corresponding linear transformed output data value.

Preferably, the apparatus operates during predetermined clocking periods and the interconnection network interconnects current multiplier outputs to corresponding ones of the signed accumulator means in a single clocking period.

The linear transformed output data values can comprise a discrete cosine transform of the input data values or inverse discrete cosine transform of the input data values depending on requirements.

The interconnection network preferably can include a plurality of cross bars interconnecting predetermined ones of the multiplier means with each of predetermined ones of the signed accumulator means.

The series of the multiplication means can be implemented as a series of shifters and adders in addition to a series of partial sums.

In accordance with a further aspect of the present invention, there is provided a linear transform apparatus for implementing a linear transform on input data values to produce linear transformed output data, the apparatus comprising: input means for inputting input data values one after another to a series of multiplication means; memory storage means for storing a predetermined series of constants, and outputting a number of the constants, as determined by a corresponding input data value index, to corresponding ones of the series of multiplication means; a series of multiplication means interconnected with the memory storage means and the input means for multiplying outputted constants stored in the memory means by a current input data value to produce a current multiplier output; a series of signed accumulator means each interconnected to a single corresponding multiplication means, the signed accumulator means producing an intermediate accumulator output by accumulating a corresponding the current multiplier output with a previous intermediate output, each of the signed accumulator means outputting the intermediate accumulator output as a corresponding linear transformed output data value.

In accordance with a further aspect of the present invention, there is provided a method of implementing a linear transform on a series of input data values, the method comprising the steps of: simultaneously multiplying the a current one of the input data values by a constant value to produce a series of multiplier output values; simultaneously accumulating the multiplier output values with previous accumulations of the multiplier output values to produce intermediate transformed values; after a predetermined number of cycles outputting the intermediate transformed values as a linear transform of the input data values.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 5 illustrates a third form of cross bar of FIG. 2.

DESCRIPTION OF PREFERRED AND OTHER EMBODIMENTS

In the preferred embodiment of the present invention, a discrete cosine transform process is disclosed which utilizes the properties of a linear transform to provide for an more effective form of discrete cosine transform calculation circuit.

Given a N-dimensional vector $x=(x_0, \ldots, x_{N-1})$ and a linear transform $\tau$ to be applied to it producing a vector $y=(y_0, \ldots, y_{M-1})$ then the following properties hold for the linear transform:

$$\vec{y} = \tau(\vec{x}) = \tau((x_0, \ldots, x_{N-1})) \qquad (1)$$

$$= \tau((x_0, 0, \ldots, 0)) + \ldots + \tau((0, \ldots, x_i, \ldots, 0)) + \ldots + \tau((0, \ldots, 0, x_{N-1}))$$

$$= x_0\tau((1, 0, \ldots, 0)) + \ldots + x_i\tau((0, \ldots, 1, \ldots, 0)) + \ldots + x_{N-1}\tau((0, \ldots, 0, 1))$$

$$= x_0\tau(\vec{u}_0) + \ldots + x_i\tau(\vec{u}_i) + \ldots + x_{N-1}\tau(\vec{u}_{N-1})$$

Eq. 1 shows that the vector x can be transformed into the vector by adding the contribution of each transformed unit vector $\tau(\vec{u}_i)$ scaled by $x_i$. The unit vectors $\vec{u}_i$ have all their components equal to zero, except for the i-th which is equal to 1. Since there are only N unit vectors and since N is generally not large, when calculating $\vec{y}$ for a large number of $\vec{x}$, the vectors $\tau(\vec{u}_i)$ can be precomputed, stored in an appropriate memory and accessed according to their index i.

Figure 1:
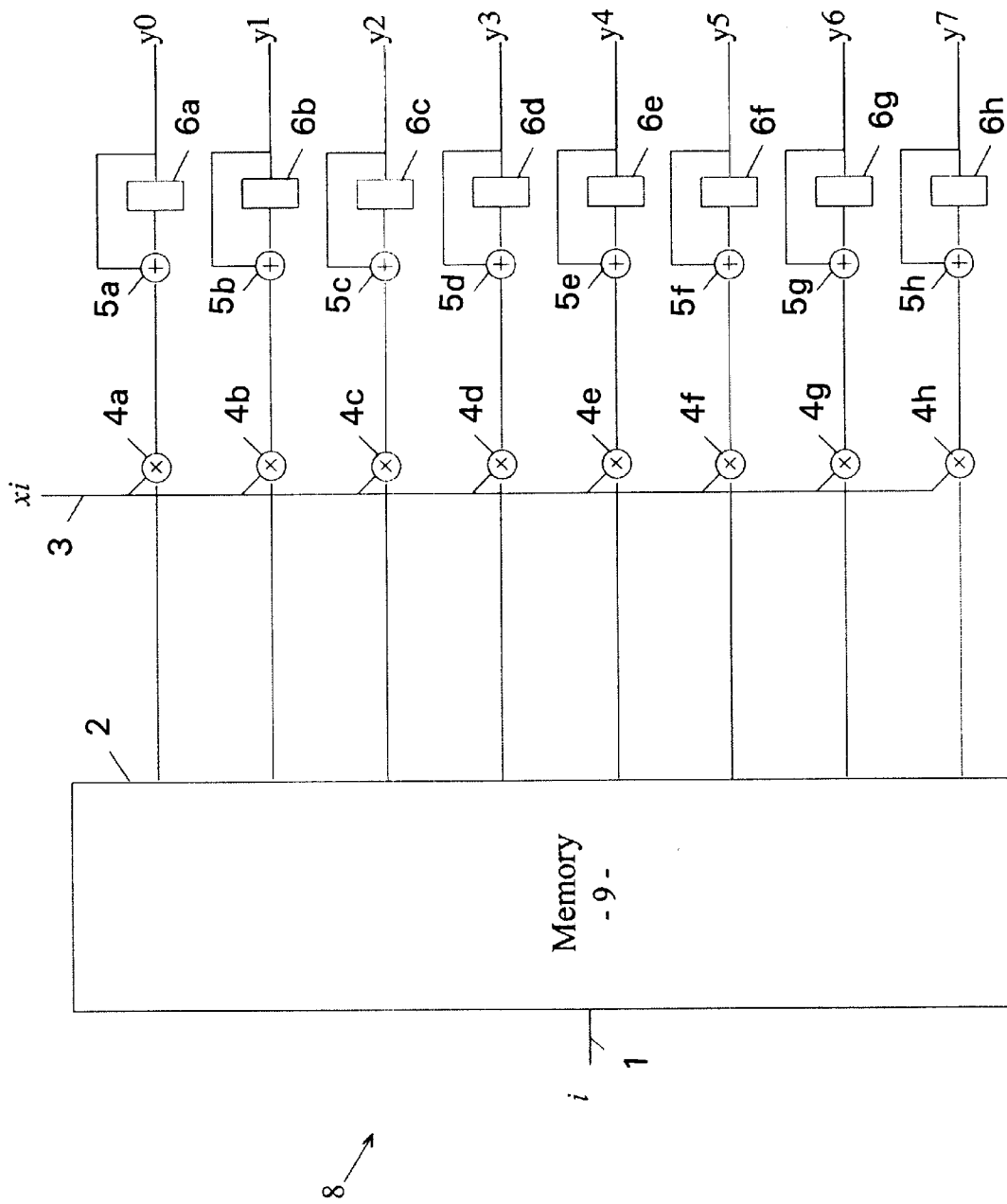
FIG. 1 illustrates a first embodiment of the present invention.

FIG. 1 shows a first example architecture 8 to compute a linear transform according to this method, illustrated in the case of M=N=8. Each of the components $x_i$ of the vector $\vec{x}$ is presented at the input 3 in any predetermined order. At the same time, the index i is presented at the input 1 to memory 9. The index retrieves the precomputed transformed unit vectors $\tau(\vec{u}_i)$ from the memory 9. The retrieved vector is scaled by the $x_i$ value with the multipliers 4a to 4h. Finally, the contribution of each scaled vector is added to the registers 6a to 6h using the adders 5a to 5h. For a transform of a N dimensional vector, N steps are required, one per component. The value of each register 6a to 6h is set to zero at the beginning of the transformation. After the N steps the registers 6a to 6h contain the value of the transformed vector $\tau(\vec{x}_i)$ for output.

By way of refinement, it is generally possible to make changes and simplifications to this general scheme in order to take advantage of the peculiarities of each transform.

Without limiting the generality of the invention and for illustration purposes of preferred embodiments only, we can consider the standard case of the DCT on a vector $\vec{x}$ of size 8, producing an output vector $\vec{y} = c(\vec{x})$, again of size 8. The latter can be defined as:

$$y_i = c_i \sum_{j=0}^{7} \cos\frac{(2j+1)i\pi}{16} x_i \text{ with } c_0 = \frac{1}{\sqrt{8}}, c_i = \frac{1}{2} \forall i \neq 0 \qquad (2)$$

Using Eq. 2 it is easy to calculate the transformed unit vectors $c(\vec{u})$. These are shown below:

$c(\vec{u}_0) = (k_0, k_1, k_2, k_3, k_0, k_4, k_5, k_6)$ $c(\vec{u}_1) = (k_0, k_3, k_5, -k_6, -k_0, -k_1, -k_2, -k_4)$ $c(\vec{u}_2) = (k_0, k_4, -k_5, -k_1, -k_0, k_6, k_2, k_3)$ $c(\vec{u}_3) = (k_0, k_6, -k_2, -k_4, k_0, k_3, -k_5, -k_1)$ $c(\vec{u}_4) = (k_0, -k_6, -k_2, k_4, k_0, -k_3, -k_5, k_1)$ $c(\vec{u}_5) = (k_0, -k_4, -k_5, k_1, -k_0, -k_6, k_2, -k_3)$ $c(\vec{u}_6) = (k_0, -k_3, k_5, k_6, -k_0, k_1, -k_2, k_4)$ $c(\vec{u}_7) = (k_0, -k_1, k_2, -k_3, k_0, -k_4, -k_5, -k_6) \qquad (3)$ Where $$k_i \begin{cases} c_i \cos\frac{\pi i}{16} & \text{for } i = 0, 1, 2, 3 \\ c_i \cos\frac{\pi(i+1)}{16} & \text{for } i = 4, 5, 6 \end{cases} \qquad (4)$$

As it can readily seen from Eq. 3, it is possible to construct any transformed unit vector using a combination of seven constants $k_0$ to $k_6$ only, chosen with the appropriate sign.

This observation allows for a modification the architecture shown in FIG. 1. Such modification is shown 16 in FIG. 2. Each component $x_i$ of a vector $\vec{x}$ is presented to the input 10. It is then multiplied by each constant $k_{0-6}$ by the constant multipliers 11a to 11g. By using the 7×8 crossbar 12, a scaled, transformed unit vector $x_i c(\vec{u}_i)$ is constructed from the $x_i k_i$ products. This can be achieved thanks to the crossbar's ability to flexibly interconnect its inputs to its outputs. The correct sign for each of components of the crossbar output vector, according to Eq. 6, determines whether their contribution is added to or subtracted from the registers 14a to 14h by the adders/subtractors 13a to 13h. The index i of the component $x_i$ determines the selection pattern for the crossbar 12 as well as the sign for adders/subtractors 13a to 13h.

As in the case with the arrangement of FIG. 1, eight steps, one per component, are necessary to complete the transformation of the vector $\vec{x}$. The registers 14a to 14h are cleared to zero at the start. It can be noticed that in accordance with Eq. 3, the register 14a only needs a simple adder 13a as the sign of each component of the vector $c(\vec{u}_0)$ is always positive.

Figure 2:
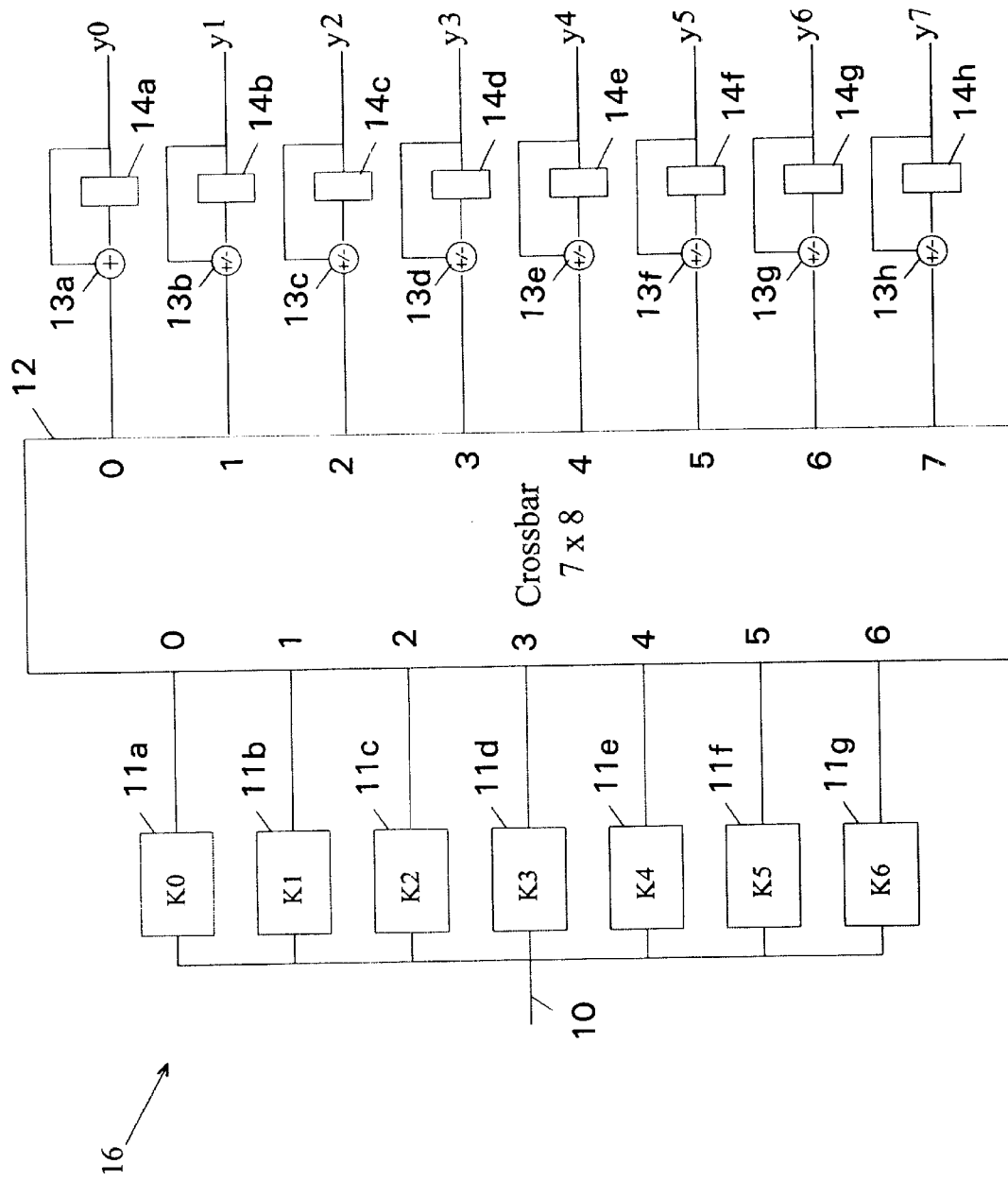
FIG. 2 illustrates a second embodiment of the present invention directed to a discrete cosine transforming implementation.

Importantly, the same architecture shown in FIG. 2 can also be used to compute the Inverse Discrete Cosine Transform (IDCT) $\vec{x} = \Gamma(\vec{y})$ as well. In fact, in the latter case, the transformed unit vectors can be constructed using the same $k_i$ constants used for the DCT.

The IDCT of each of the unit vectors is shown below:

$\Gamma(\vec{u}_0) = (k_0, k_0, k_0, k_0, k_0, k_0, k_0, k_0)$ $\Gamma(\vec{u}_1) = (k_1, k_3, k_4, k_6, -k_6, -k_4, -k_3, -k_1)$ $\Gamma(\vec{u}_2) = (k_2, k_5, -k_5, -k_2, -k_2, -k_5, k_5, k_2)$ $\Gamma(\vec{u}_3) = (k_3, -k_6, -k_1, -k_4, k_4, k_1, k_6, -k_3)$ $\Gamma(\vec{u}_4) = (k_0, -k_0, -k_0, k_0, k_0, -k_0, -k_0, k_0)$ $\Gamma(\vec{u}_5) = (k_4, -k_1, k_6, k_3, -k_3, -k_6, k_1, -k_4)$ $\Gamma(\vec{u}_6) = (k_5, -k_2, k_2, -k_5, -k_5, k_2, -k_2, k_5)$ $\Gamma(\vec{u}_7) = (k_6, -k_4, k_3, -k_1, k_1, -k_3, k_4, -k_6) \qquad (5)$ Thus, the construction of scaled inverse transformed unit vectors can be achieved with no modification of the circuit 16 shown in FIG. 2. In fact, the combination of the crossbar and the adder/subtractor is flexible enough for both the DCT and its inverse. As with the DCT case, each component $y_i$ of the vector $\vec{y}$ is presented at the input 10 where the appropriate vector $y_i \Gamma(\vec{u}_i)$ is calculated and added to the registers 14a to 14h. Again, as for the DCT case, only a simple adder is required for register 14a.

It is also possible to simplify the arrangement of FIG. 2 further to simplify the device even further. For example, it is well known that a constant multiplier can be implemented with shifters and adders. However, in this case, since multiple constants $k_0$ to $k_6$ are multiplied by the same value $x_i$, some of the partial products can be shared in order to minimize the amount of hardware required in implementing multipliers $k_0$ to $k_6$.

In practical applications, the constants $k_{0-6}$ can be represented as fixed points numbers with as little as 11 bits each. The code fragment below shows a possible implementation of the multiplication of an integer value x by the constants $k_{0-6}$ of Eq. 4 in this particular case:

$x3=(x<<1)+x;$ $x5=(x<<2)+x;$ $x7=(x<<3)-x;$ $x17=(x<<4)+x;$ $c6=x17+(x<<3);$ $k6=c6<<4;$ $k5=(x17+(x<<5))<<4;$ $k4=(c6+(x17<<5))<<1;$ $k3=x7+(x5<<5)+(x3<<9);$ $k2=(c6+(x7<<6))<<2;$ $k1=c6+(x3<<6)+(x7<<8);$ $k0=(x+(x5<<5))<<3;$

The variables K0–K6 will contain the value x multiplied by the constants $k_0$–$k_6$ and scaled by 4096. This code demonstrates that the multipliers 11a to 11g in FIG. 2 can be implemented with as little as fourteen adders. It should also be noticed that shift by a constant has no cost in terms of cell area in a VLSI implementation.

The principle of sharing partial products can also be exploited when the constants are represented with a different number of bits. In the case of different transforms, when different constants are involved, the same principle can still apply.

Another important component that can be greatly simplified is the crossbar 12. In fact, only a few of the combinations of the input to output connections are required. This can clearly be seen from looking down the columns of the matrix of Eq. 3. In particular, the only relevant ones are those that form the transformed and scaled unit vectors shown in Eq. 3 and 5.

Figure 3:
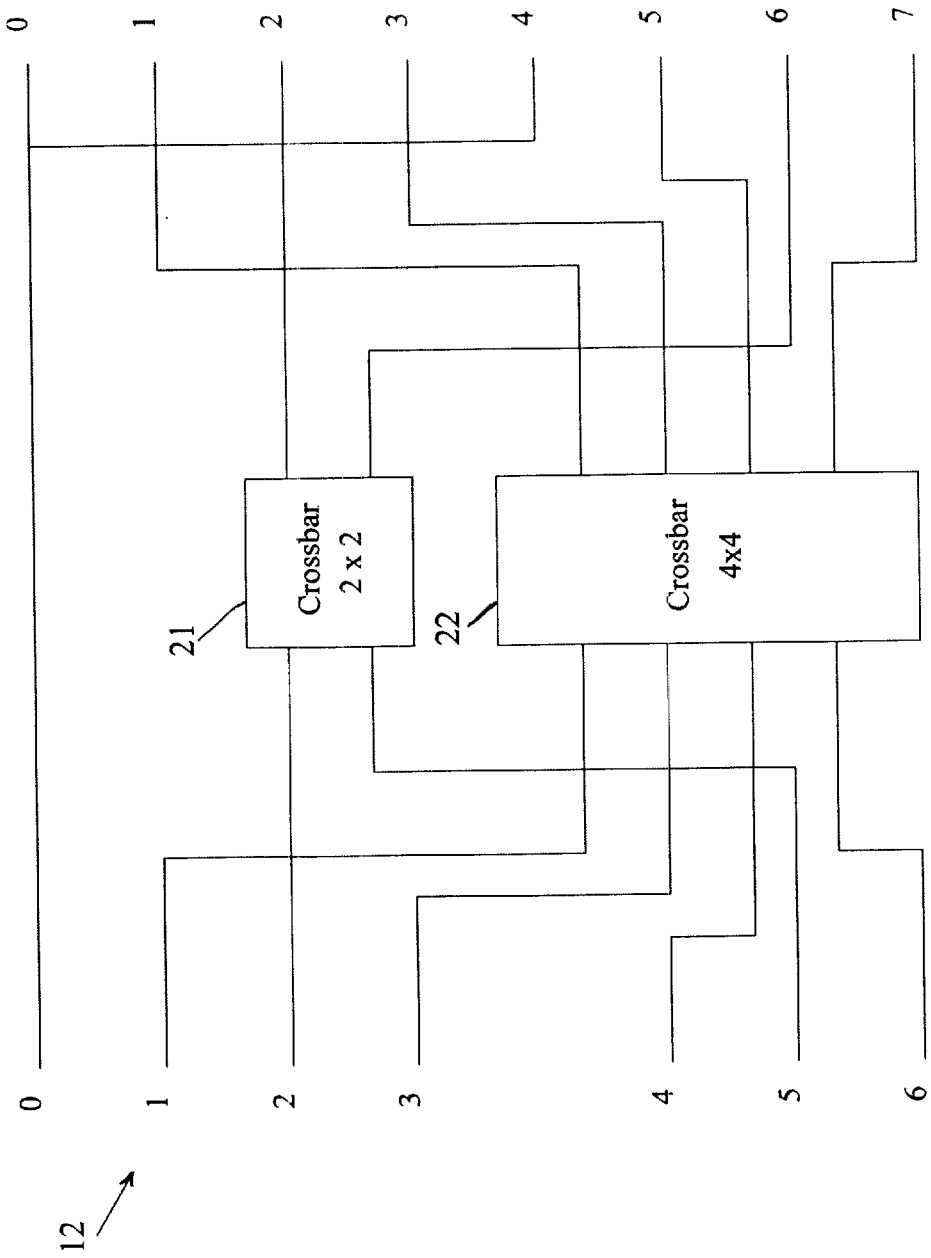
FIG. 3 illustrates one form of cross bar of FIG. 2.

FIG. 3 shows a possible implementation of the crossbar 12 in the case of the DCT only. This particular implementation only requires one 2×2 crossbar 21 and one 4×4 crossbar 22. Controlling the crossbar 12 is also simpler since a smaller number of selection lines are now needed.

Figure 4:
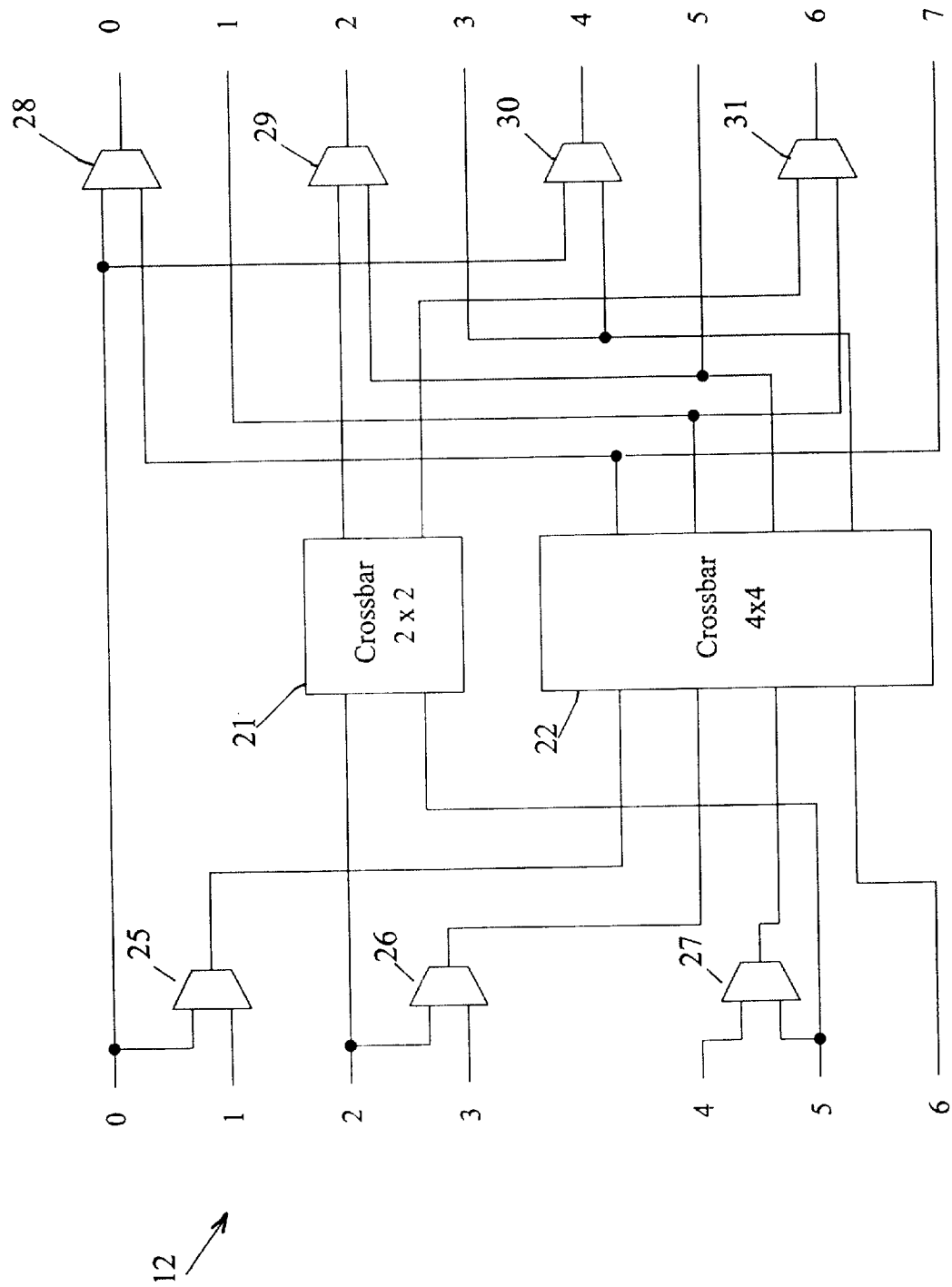
FIG. 4 illustrates another form of cross bar of FIG. 2.

FIG. 4 shows a possible implementation of the same crossbar 12 that allows both DCT and IDCT to be performed. Albiet slightly more complicated, its complexity is kept low in comparison to a full crossbar. Basically, the only difference consists of seven 2 to 1 multiplexers 25–31 to implement the combinations set out in Eq. 5.

Finally, FIG. 5 shows a possible implementation of the crossbar 12 in the case of the IDCT only. The arrangement 12 of FIG. 5 includes a crossbar 35 and multiplexers 36–38 and implements the matrix mapping of Eq. 5

The architecture of FIG. 4 was tested using both the DCT and its inverse tested on 8×8 blocks of data. The same type structure was used to perform both horizontal and vertical transforms (as is well known in the art). A precision of 11 bits was judged sufficient for the constants $k_0$–$k_6$. A desirable internal precision was found to be 15 bits for the horizontal transform and 14 for the vertical.

The accuracy of the transform and its inverse was tested on randomly generated blocks of 8 bit pixels as well as on real images. For each block, the DCT was calculated. The IDCT was then calculated on the result. The PSNR for IDCT output was then evaluated. If we indicate with $\hat{x}_i$ the result of the DCT-IDCT transform, then the PNSR is defined as:

$$PSNR_{db} = 10\log_{10}\frac{64(255)^2}{\sum_{i=0}^{63}(x_i-\hat{x}_i)^2} \quad (6)$$

The worst PSNR observed on over one million blocks tested was better than 51 dB. PSNR values greater than 40 dB are generally considered sufficient for most current applications.

It will therefore be evident that the preferred embodiment includes a simple and fast implementation of the DCT and its inverse. The architecture presented can be quite easily extended to other linear transform or to the DCT itself in the case of a vector's dimension larger than 8. The low complexity, low cost and high speed of the design make it particularly attractive for modern multimedia applications such as digital camera and media processors.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

I claim:

1. A transform apparatus for implementing a linear transform on an input data vector to produce a transformed output data vector, the apparatus comprising:

a plurality of multipliers, each receiving a corresponding component of said input data vector for multiplying the component of the input data vector directly by a corresponding transform constant of a transform unit vector to produce a corresponding component of a multiplier output;

a programmable interconnection network interconnecting said multiplier output to an input of a corresponding one of a plurality of signed accumulators; and, the plurality of signed accumulators, each signed accumulator interconnected to said interconnection network and each of said signed accumulators producing an intermediate accumulator output by accumulating a corresponding one of said corresponding multiplier outputs with a corresponding previous accumulator output, each of said signed accumulators outputting said intermediate accumulator output as a component of the transformed output data vector.

2. The transform apparatus as of claim 1, wherein said interconnection network comprises a cross bar interconnecting the multiplier output of each of said multipliers to the input of each of said signed accumulators.

3. The transform apparatus of claim 1, wherein said apparatus operates during predetermined clocking periods and said interconnection network interconnects current multiplier outputs to corresponding ones of said signed accumulators in a single clocking period.

4. The transform apparatus of claim 1 wherein said interconnection network includes a plurality of cross bars interconnecting predetermined ones of said multipliers with each of predetermined ones of said signed accumulators.

5. The transform apparatus of claim 1 wherein said plurality of multipliers is implemented as a series of shifters and adders in addition to a series of partial sums.

6. A linear transform apparatus for implementing a linear transform on an input data vector to produce a transformed linear output data vector, the apparatus comprising:

a memory for storing a predetermined series of transform unit vector constants, and outputting a number of said transform unit vector constants, as determined by a corresponding input index, to corresponding ones of a plurality of multipliers;

the plurality of multipliers interconnected with said memory for multiplying outputted constants stored in the memory by a corresponding input data value a corresponding component of the input data vector directly to produce a corresponding multiplier output; and a plurality of accumulators, each interconnected to a single corresponding multiplier, each signed accumulator producing an intermediate accumulator output by adding a corresponding said current multiplier output with a previous intermediate output, each of said signed accumulators outputting said intermediate accumulator output as a component of the linear transformed output data vector.

7. A method of implementing a linear transform on an input data vector, said method comprising the steps of:

simultaneously multiplying a current component of said input data vector directly by a corresponding transform constant of a transform unit vector to produce a plurality of multiplier output values;

simultaneously multiplier output values with previous additions of said multiplier output values to produce intermediate transformed values; and after a predetermined number of cycles outputting said intermediate transformed values as a linear transform of said input vector.

8. The method of implementing any linear transform claim 7, wherein said linear transform comprises one of a discrete cosine transform and an inverse discrete cosine transform of said input data vector.

* * * * *